F. A. POWELL & SUSANNA L. ROBINSON.
FLAT-IRON HEATER.

No. 181,718. Patented Aug. 29, 1876.

WITNESSES:
Francis McArdle,
John Goethals

INVENTOR:
F. A. Powell
S. L. Robinson
BY Munn
ATTORNEYS.

UNITED STATES PATENT OFFICE.

FRANKLIN A. POWELL AND SUSANNA L. ROBINSON, OF PONTIAC, ILLINOIS.

IMPROVEMENT IN FLAT-IRON HEATERS.

Specification forming part of Letters Patent No. 181,718, dated August 29, 1876; application filed July 22, 1876.

*To all whom it may concern:*

Figure 1:
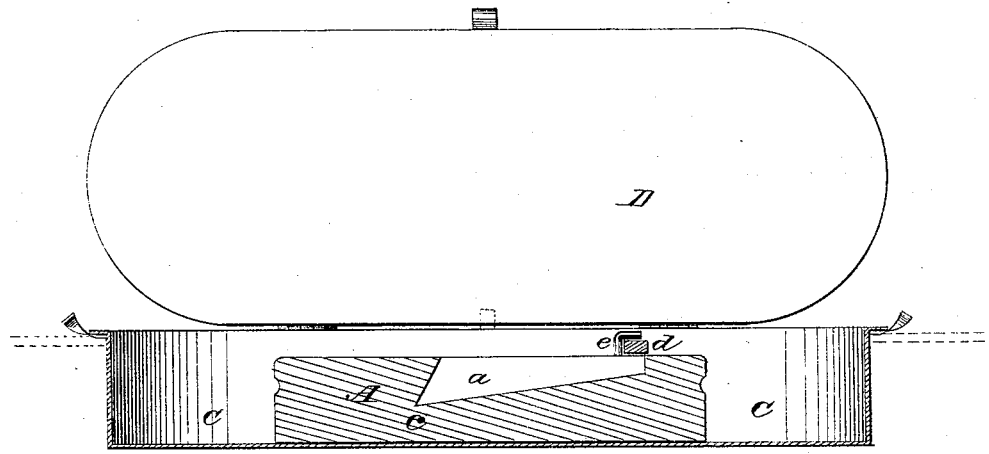
Figure 2:
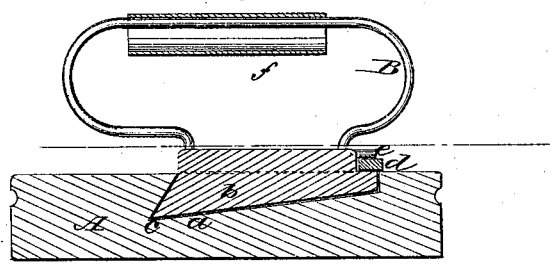
Figure 3:
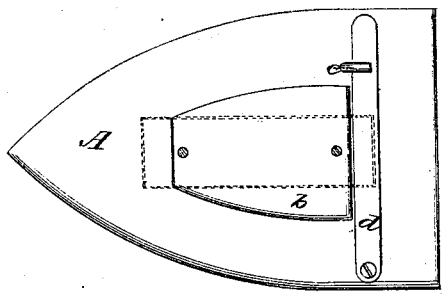

Be it known that we, FRANKLIN A. POWELL and SUSANNA L. ROBINSON, of Pontiac, in the county of Livingston and State of Illinois, have invented a new and Improved Sad-Iron and Heater, of which the following is a specification:

Figure 1 is a longitudinal section of a sad-iron heater and sad-iron. Fig. 2 is a longitudinal section of a sad-iron with our improved handle attached. Fig. 3 is a top view.

Similar letters of reference indicate corresponding parts.

Our invention consists in the arrangement of a hollow detachable handle with a sad-iron.

A is the body of the sad-iron, having an angular socket, $a$, which receives the lower portion $b$ of the handle B. The bottom of the socket inclines downward toward the front, and the front end is cut under, so that the end and the bottom of the socket meet in an acute angle at C.

The part of the handle that attaches to the iron is made to fit the socket, and is cut down at the rear end even with the upper surface of the iron, to allow the latch $d$ to swing over it and under a hook, $e$, attached to the iron. The portion $f$ of the handle that is taken in the hand is made in any suitable form, but is hollow throughout and open at the ends, to admit of a circulation of air to keep the handle cool.

The heater C consists of a receptacle made from cast or sheet iron, and fitted to the holes in the top of the stove, and provided with a cover, D. Its form may be varied to suit the stoves to which it is adapted.

The advantages claimed for our invention are, that the handle may be readily attached and detached, dispensing with more than one handle, and making it more convenient to heat the irons, as they can be entirely inclosed in the heater described, utilizing all of the heat. The handle also, being hollow, retains less heat than the solid ones.

Having thus described our invention, we claim as new and desire to secure by Letters Patent—

The combination of the socket $a$, body A, part $b$, hollow portion $f$, latch $d$, and hook $e$, substantially as shown and described.

FRANKLIN A. POWELL.
SUSANNA L. ROBINSON.

Witnesses:
H. G. GREENBAUM,
D. C. EYLAR.